United States Patent

Karlsson

[11] Patent Number: 4,529,633
[45] Date of Patent: Jul. 16, 1985

[54] THERMAL CAMOUFLAGE
[75] Inventor: Lars G. Karlsson, Gamleby, Sweden
[73] Assignee: Diab-Barracuda AB, Laholm, Sweden
[21] Appl. No.: 568,606
[22] Filed: Jan. 6, 1984
[30] Foreign Application Priority Data Jan. 14, 1983 [SE] Sweden ................................ 8300124

[51] Int. Cl.³ .............................................. F41H 3/00
[52] U.S. Cl. ......................................... 428/17; 428/49; 428/102; 428/159; 428/919
[58] Field of Search .................... 428/919, 17, 49, 102, 428/159, 904.4

[56] References Cited

U.S. PATENT DOCUMENTS

| | | | |
|---|---|---|---|
| 4,064,305 | 12/1977 | Wallin | 428/919 X |
| 4,142,015 | 2/1979 | Bienz | 428/919 X |
| 4,243,709 | 1/1981 | Morton | 428/919 X |
| 4,308,882 | 1/1982 | Pusch et al. | 428/919 X |
| 4,340,634 | 7/1982 | Pusch et al. | 428/904.4 X |
| 4,433,025 | 2/1984 | Pusch et al. | 428/904.4 X |
| 4,464,418 | 8/1984 | Pusch et al. | 428/904.4 X |
| 4,465,731 | 8/1984 | Pusch et al. | 428/256 X |
| 4,467,005 | 8/1984 | Pusch et al. | 428/111 |
| 4,479,994 | 10/1984 | Berg | 428/919 X |
| 4,493,863 | 1/1985 | Karlsson | 428/17 |
| 4,495,239 | 1/1985 | Pusch et al. | 428/919 X |

OTHER PUBLICATIONS

The Title Page and Page 86 of the Modern Plastics Encyclopedia 1972-1973, vol. 49: No. 10A, Oct. 1972.

Primary Examiner—Henry F. Epstein
Attorney, Agent, or Firm—Lee, Smith & Zickert

[57] ABSTRACT

The invention relates to a thermal camouflage material comprising a supporting layer (4), e.g. a woven material, on which a polyethylene film layer (1), metallized on one side, has been laminated with the aid of fusion adhesive (3). The exposed surface of the plastic film is embossed to make it matte. Polyethylene is highly transparent to infrared radiation and has low emissivity, self radiation. By means of the metal layer (2) there is also obtained radiation insulation so that the outer layer (1) is in a thermal equilibrium which is hardly affected, e.g. by a warm object which is covered with the material, and the outer layer has a low emission ability of about 0.4-0.95, depending on thickness and pigmentation. By applying further patchy layers (5) patchy images will be obtained in image-forming by infrared sensitive instruments in the wavelength ranges 3-5 μm and 8-14 μm. The camouflage material may also include a layer of plastic foam insulating material arranged inwardly of the supporting layer.

8 Claims, 10 Drawing Figures

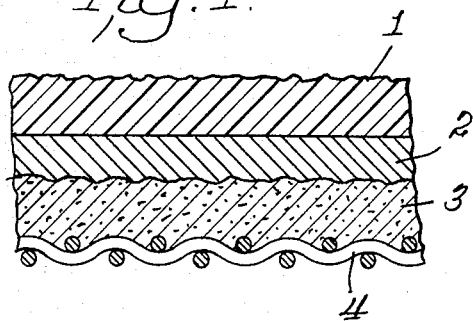
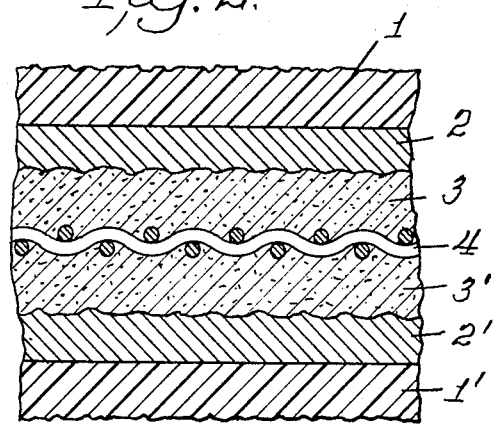
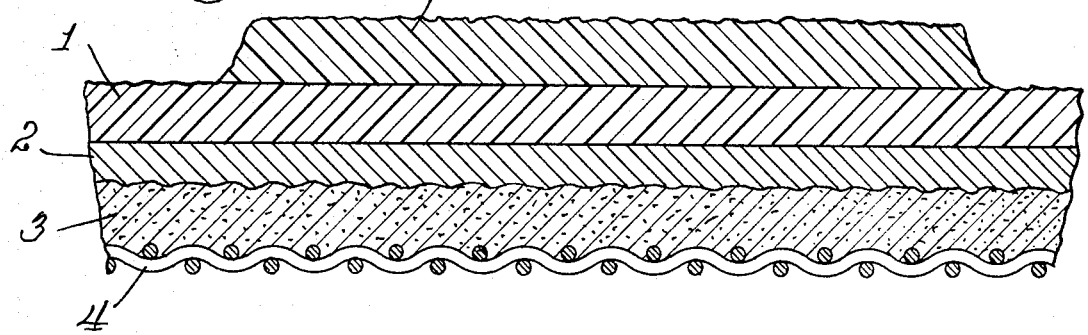
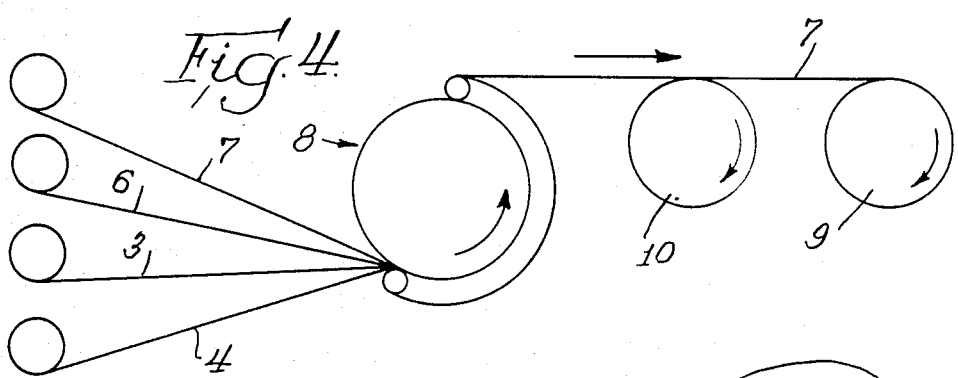
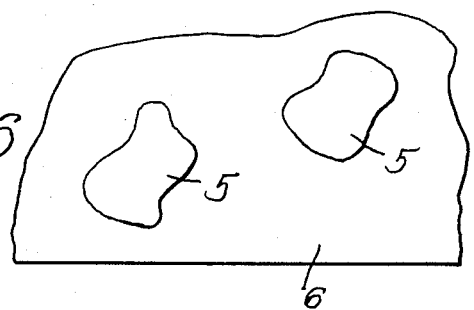
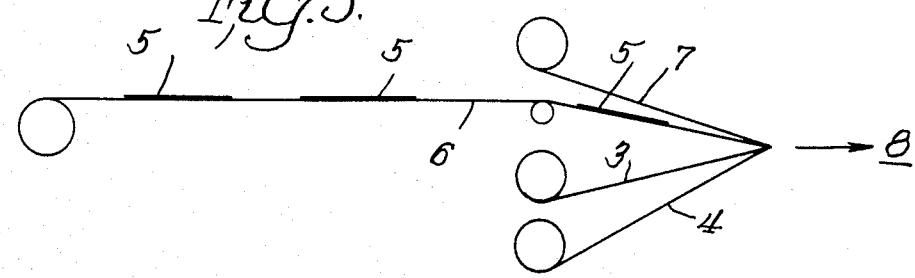

THERMAL CAMOUFLAGE

The invention relates to thermal camouflage equipment and/or personnel covering material comprising a flexible supporting layer, a metallic reflecting layer to provide thermal and radar camouflage, and an outer layer of plastics material having certain wave energy transmission characteristics for thermal camouflage purposes and also containing coloring material to provide visual camouflage and having certain wave energy transmissivity for thermal camouflage characteristics.

Known camouflage materials have genrally had a very open, apertured structure as, for example, the camouflage nets. The proportionate covering of such conventional materials is about 50–65%. This has been found to be insufficient when warm objects are to be masked against thermal reconnaissance. One object of the present invention is to provide a camouflage material which hides such warm objects from thermal detection and which is capable of giving a picture to a heat-sensitive camera which does not distinguish from what can be expected from the general terrain.

The shielding provided only by camouflage material of the tarpaulin type will be heated by a warm object covered by the material and, while the structure and contours of such an object cannot be observed visually, the higher temperature of the exposed surface will be vulnerable to detection by infrared energy sensitive cameras and instruments so that such camouflage material is not satisfactory for many purposes.

Thermal reconnaissance is a military scouting method the technology of which has been greatly developed during recent years. This makes it necessary to provide camouflage counter-measures. The approach has been to provide double-layered structures wherein the outer, exposed camouflage material is insulated from a covered source of heat by a layer of insulating material arranged under and spaced from the outer material. However, the exposed camouflage material may still be heated or cooled by external conditions. The material may be heated or cooled by the air or heated by the sun or cooled by radiation to outer space.

Such double structures are not only inadequate from a thermal detection standpoint but are also impractical for handling in field conditions. It is, accordingly, one of the objects of the invention described herein to provide a thermal camouflage material which is easy to lay out, may be folded in about the same way as a tarpaulin and which is easy to transport, and, above all, which provides good masking effect against broadband thermal reconnaissance.

The atmosphere is quite transparent to thermal radiation in the wavelength ranges of 3–5 $\mu$m and 8–14 $\mu$m, and it is within these ranges that thermal camouflage must be provided. Thermal energy radiated from sources in other wavelength ranges within the thermal spectrum is heavily absorbed in the atmosphere and for practical camouflaging purposes may be more or less ignored.

In accordance with the present invention, instead of conventional insulation of the observable outer camouflage layer there is used a combination of a reflecting surface characterized by essentially non-specular reflection which reflects heat radiated from external sources. The camouflage material of the invention is provided with an outer surface which exhibits low emissivity. Low emissivity is achieved by use of a plastics material having high transmissivity, and therefore low emissivity, in the spectrum range to be controlled.

More specifically, the objects and advantages of the invention are achieved by a metallic electromagnetic energy reflecting layer in combination with and underlying the exposed outer layer which has high transmissivity in the wavelength ranges 3–5 $\mu$m and 8–14 $\mu$m. Specular reflection is minimized by providing the exposed surface with a matte finish to further enhance the thermal camouflage effect of the material. The metallic reflecting layer is crackled, haphazardly broken up, to form, also, a mosaic structure for controlling radar reflection.

A suitable plastics material for the outer, exposed layer is polyethylene coloured throughout with a pigment having a low energy absorbing characteristic. The pigment may be selected to provide the desired visual camouflage effect. The polyethylene may be used in the form of a pre-cast film or in the form of a liquid such as a plastisol. Both the polyethylene and the pigment have low energy absorbing characteristics.

If polyethylene film is used, it may be provided with a vaporized aluminum coating and this metallized film may be laminated together with the camouflage material supporting layer by means of a fusion adhesive. If a structured, perhaps engraved, roller is used in laminating, or if a master release band is applied to the plastic film surface and stripped off after lamination, a matte surface is obtained on the polyethylene film. The very thin aluminum coating is broken up during lamination and handling to the haphazard mosaic form already mentioned above so that specular reflection of energy in the thermal ranges will be avoided.

It has been determined that the emissivity of the exposed surface layer of a suitable camouflage material may be in the range 0.4–0.95. The emissivity depends upon the material used, the thickness of the layer, the characteristics of the pigments employed and the degree of mattness of the surface. In accordance with a preferred embodiment, areas having differing thicknesses may be provided during lamination to enhance the thermal camouflage effect. This can also be done by laying on patches of different sizes and shapes (which can have different colours in the visible range). Another method to achieve the desired result is to interpose a partially perforated film above the metal-coated plastics layer. The object is to obtain a variegated effect in a thermal picture responsive to the differing emission factors at different areas of the camouflage material so that the range which actually does have the same temperature appears to have completely different temperatures. There may be varying equilibrium temperatures.

Another method for obtaining differing temperatures at different areas of the exposed surface of the camouflage material is to provide spaced small openings in the material. Both cooling and heating is thus effected in different zones by wind and convection. The total area of the small openings should not be more than about 5.0% of the area of the camouflage material.

The invention will be described in detail with reference to the drawings which illustrate exemplary embodiments of the invention.

FIG. 1 schematically illustrates on greatly enlarged scale a section through an embodiment of a thermal camouflage material.

FIG. 2 illustrates a second embodiment with coatings on both sides of the supporting layer.

FIG. 3 illustrates a third embodiment where the outer layer has, in patches, different thicknesses.

FIG. 4 schematically illustrates a laminating operation.

FIG. 5 schematically illustrates a modified laminating operation.

FIG. 6 illustrates the product of the operation according to FIG. 5.

Figure 7:
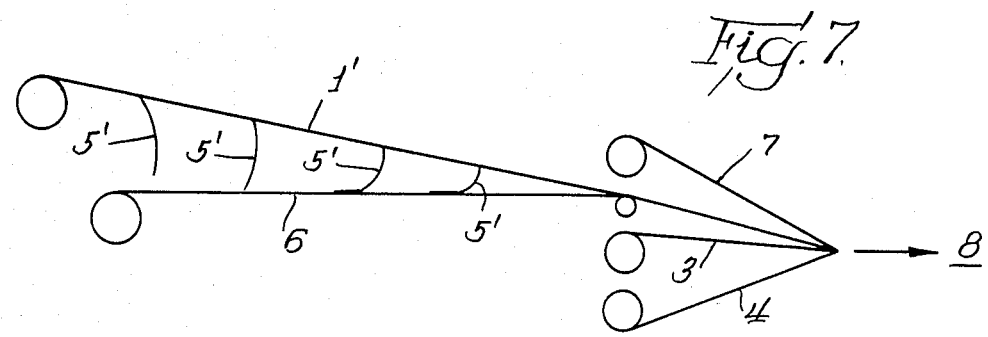
Figure 8:
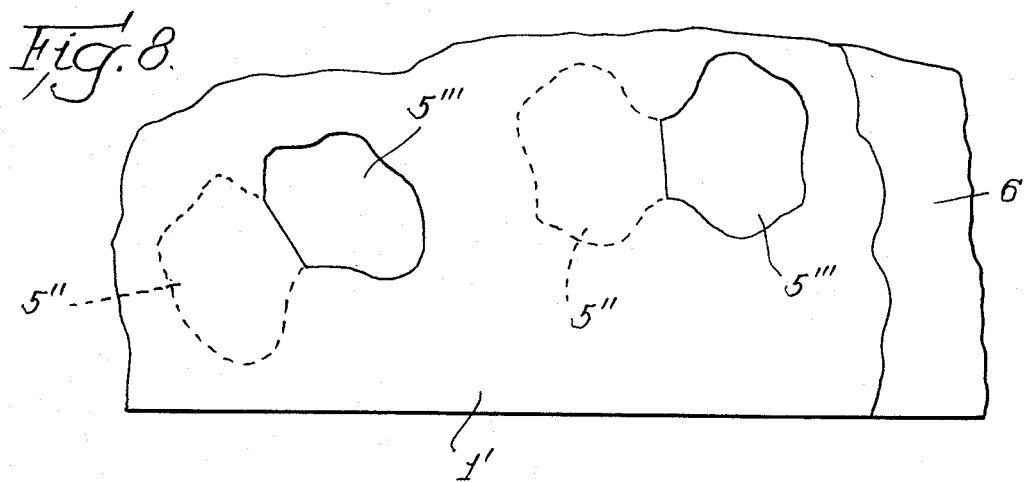

FIG. 7 schematically illustrates a further modified laminating operation, and FIG. 8 illustrates the result thereof.

Figure 9:
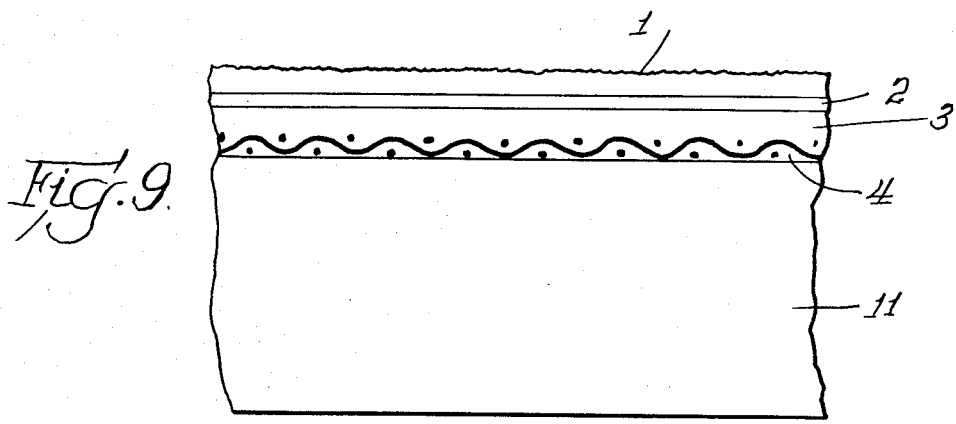
Figure 10:
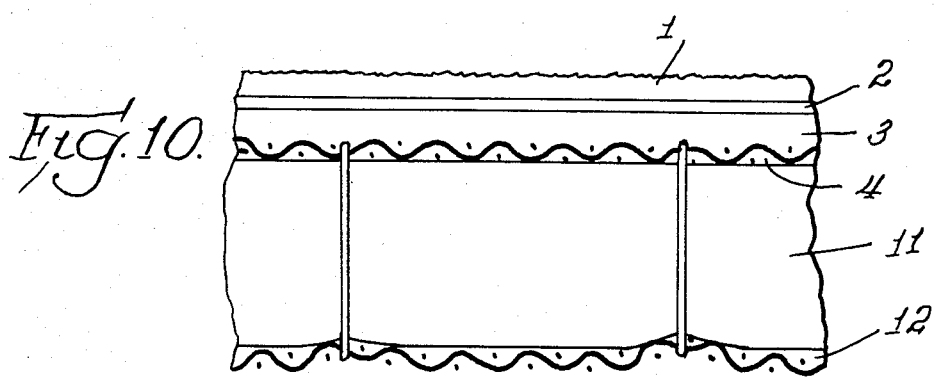

FIGS. 8 and 9 and 10 schematically illustrate further embodiments of the in vention.

FIG. 1 illustrates the structure of a first example. Uppermost, for facing outwards, there is a polyethylene layer 1 with a matte surface, and thereunder a crackled metallic layer 2, an adhesive layer 3 and a supporting layer 4.

The supporting layer 4 may be a fabric material of woven polyester or polyamide fibers and it may contain metal or carbon fibers effective for radar wavelengths camouflage. This layer may also be non-woven felt of similar material or to advantage band woven from high density polythylene or polypropylene. Such material gives high tearing strength in relation to its weight and is thin. It can be coated with thin films of polyethylene or polypropylene, for example.

The layer 3 may be an adhesive film of the ethylenevinyl acetate copolymer "hot melt" glue type.

The metallic layer 2 shall be reflective within the wavelength range 2–15, $\mu$m, and may also be reflective of other wavelengths as well. Vapourized aluminum coatings over 5 nanometers in thickness give such properties. Thicknesses of about 50 nanometers function well and such layers may be deposited on polyethylene film.

The layer 1 is suitably a polyethylene film, coloured with a green pigment which has moderate absorption of energy in the thermal infrared ranges. This film plastic material is usually obtained "blown", i.e. in manufacture it is blown to tubes which are slit, flattened and rolled up. These films are provided with the metallic layer deposit 2. This layer may also be a metal foil, e.g. aluminum, which in such a case must be very thin, however, in order to be crackled (haphazardly broken up) during lamination. Crackling occurs with great reliability, particularly if the supporting layer 4 is structured, e.g. woven.

The camouflage material schematically illustrated in cross-section in FIG. 2 incorporates the structure shown in FIG. 1 and a similarly layered structure secured to the opposite side of supporting layer 4. Thus, an outer matte-surfaced layer of polyethylene 1' having a metallic coating 2' is secured to the supporting layer 4 by means of an adhesive layer 3'. This camouflage material may be used with either side exposed to possible reconnaissance surveillance. The two outer layers may be differently coloured, if desired, to provide in a single camouflage material effective visual camouflage for two different sets of conditions, e.g. for summer and winter camouflage.

In FIG. 3, there is illustrated an example where the layer 1 is supplemented in patches with a further layer 5 of the same material possibly differently coloured and which has been attached during the laminating operation.

In FIG. 4 there is illustrated a typical laminating operation. From rolls there are pulled out and laid upon the other a carrier 7 (e.g. a woven viscose strip carrying a master matte design on its under surface), a metallized polyethylene film 6 (corresponding to the layers 1 and 2 in FIGS. 1 and 2), a hot melt glue film 3 and a supporting layer 4. These are taken into a schematically illustrated laminating machine 8 which includes the heating means indicated and come out fused together. The master carrier 7 is pulled off and the finished product is rolled up on the roll 10 while the carrier is rolled up on roll 9. The master carrier is used many times.

In FIG. 5 there is illustrated a similar laminating operation with the laminating machine 8 only indicated. In this case, loose patches 5 of the same plastic material, possibly differently coloured, are laid on the polyethylene web 6, and the whole is rolled together to form the structure obtained in FIG. 3. A plan view of the example in FIG. 5 will be seen from FIG. 6. Alternatively, a similar result with less manual work can be obtained according to FIG. 7, by a web 10 of polyethylene being provided with unconnected cuts which form depending flaps 5 when the web is drawn from the supply roller, and these flaps will lay double. A structure is then obtained with two layers of the plastic film on the main portion and, as will be seen from FIG. 8, three layers (including the patches shown in dotted lines) at areas 5" and only one layer at areas 5'''.

An alternative embodiment of the camouflage material is illustrated in FIG. 9. The laminated assembly consisting of that illustrated in, and above described in connection with, FIG. 1 is incorporated in the camouflage material of FIG. 9 and the several layers are similarly numbered. In addition, a layer of polyethylene foam 11 is secured to the under side of the supporting layer 4 to further insulate the camouflage material from any heat source covered by it. A similar camouflage structure is shown in FIG. 10 with the addition of a web 12 covering the otherwise exposed surface of the plastic foam 11. This web may be for example, non-woven polyethylene material intended to protect the foam from damage in handling the camouflage material. The layers 4, 11 and 12 may be quilted together as a subassembly as indicated, if desired.

EXAMPLE OF THE CAMOUFLAGE MATERIAL OF FIG. 1

In an example there was used as the supporting layer a woven fabric having 16×16 threads of polyamide multifilament solid drawn 235 dtex with a superficial weight of 100 g/m². The adhesive layer was Xiro type 240, superficial weight 30 g/m², and the polyethylene layer with a superficial weight of 30 g/m² metallized on one side, the polyethylene being blown low density polyethylene.

Mechanical Properties

Weight 160 g/m²
Tensional strength 700N for the whole sheet
Tear strength 70N
Pattern-embossed with repeat length 6 m, repeat width 1.5 m.
Coverage degree of embossed area 80–100%, average value for the whole material 95%.

Optical Properties

Visual: Uniform green with lightness 5.9, colour tone 23.9 and saturation 7.7.

| | |
|---|---|
| 360–440 nm | 5.0% |
| 680 nm | 4.5% |
| 750 nm | 9.5% |
| 850 nm | 57% |
| 950 nm | 61% |
| 1200 nm | 67% |

The measured lustre of the surface (Zeiss GP3 1°/4.4°+filter 75° angle) was 0.5%.

It will be understood that to provide the visual camouflage, appropriate colouration may be provided in or on the exposed outer layer or layers of plastic material or the visual camouflage may be provided by a separate covering of garnished net material.

The improved thermal camouflage achieved by the material herein described makes possible the approximate matching of electromagnetic energy radiation in the thermal wavelengths of the terrain surrounding the equipment to be hidden from surveillance. This is achieved by the combination of high transmissivity/low emissivity of the exposed outer layer of polyethylene with the non-specular limited reflection of wave energy by the mosaic-structured metallic layer.

I claim:

1. Thermal camouflage laminate material comprising a supporting layer, an outer layer of plastic material and a metal reflection layer arranged between the supporting layer and the outer layer wherein said outer layer comprises a pre-cast film of plastic material selected from the group consisting of polyethylene and polypropylene which is bonded to said supporting layer, the outer surface of said outer layer being matte-finished for reducing its specular reflection and said metal reflection layer being broken up into a mosaic structure for avoiding radar detection.

2. Thermal camouflage as claimed in claim 1, characterized in that the plastics material of the outer layer is coloured through with a camouflage pigment which is low-absorbent in the thermal infrared wavelength range.

3. Thermal camouflage as claimed in claim 1 characterized in that the supporting layer is a woven material containing conductive fibers for radar camouflage effect.

4. Thermal camouflage as claimed in claim 1, characterized in that the metal reflection layer is laid on the inner surface of the outer layer and that a layer of fusion adhesive joins the supporting layer to the metallized side of the outer layer.

5. Thermal camouflage as claimed in claim 4, characterized in that a laminate assembly of metal reflecting layer and outer layer substantially identical to that specified in claim 4 is provided and adhered to the otherwise exposed surface of said supporting layer in mirror image cross section arrangement.

6. Thermal camouflage as claimed in claim 1 and additionally including a layer of plastic foam thermal insulating material secured to the otherwise exposed surface of said supporting layer.

7. Thermal camouflage as claimed in claim 6 and additionally including a protecting web of material covering the otherwise exposed surface of said plastic foam thermal insulating material.

8. Thermal camouflage as claimed in claim 7 wherein said supporting layer, said layer of plastic foam and said protecting web are quilted together.

* * * * *